| (12) | United States Patent | (10) Patent No.: US 10,489,632 B2 |
|---|---|---|
| | Zuo et al. | (45) Date of Patent: Nov. 26, 2019 |

(54) ELECTRONIC DEVICE AND DETECTION METHOD

(71) Applicant: SHENZHEN GOODIX TECHNOLOGY CO., LTD., Shenzhen (CN)

(72) Inventors: Yong Zuo, Shenzhen (CN); Jiangtao Yi, Shenzhen (CN)

(73) Assignee: SHENZHEN GOODIX TECHNOLOGY CO., LTD., Shenzhen (CN)

(*) Notice: Subject to any disclaimer, the term of this patent is extended or adjusted under 35 U.S.C. 154(b) by 116 days.

(21) Appl. No.: 15/716,478

(22) Filed: Sep. 26, 2017

(65) Prior Publication Data

US 2018/0300529 A1 Oct. 18, 2018

Related U.S. Application Data

(63) Continuation of application No. PCT/CN2017/080792, filed on Apr. 17, 2017.

(51) Int. Cl.
  *G06F 3/041* (2006.01)
  *G06K 9/00* (2006.01)
  (Continued)

(52) U.S. Cl.
  CPC ....... *G06K 9/00087* (2013.01); *G06F 1/3262* (2013.01); *G06F 1/3293* (2013.01);
  (Continued)

(58) Field of Classification Search
  CPC ......... B25J 9/1694; G05B 2219/39372; G05B 2219/40202; G06F 1/3262; G06F 1/3293;
  (Continued)

(56) References Cited

U.S. PATENT DOCUMENTS

2011/0090161 A1* 4/2011 Tsuzaki ................ G06F 1/3203
  345/173
2012/0071149 A1 3/2012 Bandyopadhyay et al.
  (Continued)

FOREIGN PATENT DOCUMENTS

CN 105224139 A 1/2016
CN 105700668 A 6/2016
  (Continued)

OTHER PUBLICATIONS

International Search Report for International Application No. PCT/CN2017/080792, Applicant: Shenzhen Goodix Technology Co., Ltd., dated Jan. 23, 2018, 4 pages.

*Primary Examiner* — Hong Zhou (57) ABSTRACT

An electronic device and a detection method facilitate reducing power consumption of the electronic device. The electronic device includes: a touch panel having a fingerprint sensing region, a fingerprint module, a main processor and a coprocessor; where the coprocessor is configured to detect a touch event on the touch panel; the fingerprint module is configured to collect touch data of the fingerprint sensing region that corresponds to the detected touch event; and the coprocessor is further configured to acquire the touch data collected by the fingerprint module, and determine whether the touch event is a false touch according to the touch data.

17 Claims, 2 Drawing Sheets

(51) Int. Cl.
*G06F 3/0488* (2013.01)
*G06F 1/3234* (2019.01)
*G06F 1/3293* (2019.01)

(52) U.S. Cl.
CPC ............ *G06F 3/041* (2013.01); *G06F 3/0418* (2013.01); *G06F 3/0488* (2013.01); *G06K 9/00006* (2013.01); *G06K 9/00013* (2013.01); *G06K 9/00073* (2013.01)

(58) Field of Classification Search
CPC ........ G06F 3/041; G06F 3/0418; G06F 3/044; G06F 3/0488; G06K 9/00006; G06K 9/00013; G06K 9/00073; G06K 9/00087
See application file for complete search history.

(56) References Cited

U.S. PATENT DOCUMENTS

| | | | |
|---|---|---|---|
| 2013/0265278 A1* | 10/2013 | Son | G06F 3/044 345/174 |
| 2015/0095682 A1 | 4/2015 | Lim et al. | |
| 2016/0054844 A1* | 2/2016 | Lin | G06F 3/0416 345/173 |
| 2017/0061108 A1 | 3/2017 | Kwon et al. | |
| 2017/0116455 A1* | 4/2017 | Alameh | G06F 1/3215 |

FOREIGN PATENT DOCUMENTS

| | | |
|---|---|---|
| CN | 205507772 U | 8/2016 |
| CN | 106446786 A | 2/2017 |
| EP | 3018582 A2 | 5/2016 |
| KR | 20160106717 A | 9/2016 |

\* cited by examiner

ELECTRONIC DEVICE AND DETECTION METHOD

CROSS-REFERENCE TO RELATED APPLICATIONS

The present application is a continuation of international application No. PCT/CN2017/080792, filed on Apr. 17, 2017, which is hereby incorporated by reference in its entirety.

TECHNICAL FIELD

The present application relates to the field of fingerprint identification, and in particular, to an electronic device and a detection method.

BACKGROUND

For a terminal device having a function of fingerprint identification, it is necessary to use a touch panel to detect presence of a press on a specific region if a fingerprint module itself does not have a function of finger detecting. If a touch on the specified region is detected by the touch panel, the fingerprint module is started to capture a fingerprint, and then an identification process of identifying the captured fingerprint by a processor starts. However, in the prior art, even if the panel is in an off state, once a press on the touch panel is detected, the process of fingerprint identification starts, and a problem of waking up a system frequently occurs. Furthermore, the processor is required to perform the process of fingerprint identification for all touches, resulting in higher power consumption of the system, shorter standby time, and poorer user experience.

SUMMARY

The present application provides an electronic device and a detection method, which are advantageous in reducing power consumption of a system.

According to a first aspect, an electronic device is provided, including: a touch panel having a fingerprint sensing region, a fingerprint module, a main processor and a coprocessor; the coprocessor is configured to detect a touch event on the touch panel; the fingerprint module is configured to collect touch data of the fingerprint sensing region that corresponds to the detected touch event; and the coprocessor is further configured to acquire the touch data collected by the fingerprint module, and determine whether the touch event is a false touch according to the touch data.

Optionally, the electronic device may be a terminal device, such as a mobile phone or a tablet computer.

Optionally, the coprocessor is configured to detect the touch event on the touch panel when the main processor is in a dormant state.

Optionally, the main processor may be in the dormant state when the touch panel is in an off state.

Optionally, the coprocessor may instruct the fingerprint module to collect data of the fingerprint sensing region when the touch event is detected; correspondingly, the fingerprint module collects the data of the fingerprint sensing region according to the instruction of the coprocessor, and takes the collected data as the touch data corresponding to the touch event.

Optionally, the fingerprint sensing region may be at least a part of the touch panel.

In a first possible implementation manner of the first aspect, the coprocessor is configured to: acquire reference data of the fingerprint sensing region, where the reference data is collected when the fingerprint sensing region is not touched; and determine whether the touch event is a false touch according to the touch data and the reference data.

The reference data and the touch data may correspond to a same set of pixel points. Optionally, the reference data is collected by the fingerprint module when the fingerprint sensing region is not touched.

Optionally, the reference data is collected in advance, and the coprocessor may acquire the reference data from a memory.

With reference to the foregoing possible implementation manner of the first aspect, in a second possible implementation manner of the first aspect, the coprocessor is configured to: determine a number of effective touch points in a first region according to the touch data and the reference data, where the first region is at least a part of the fingerprint sensing region; and determine that the touch event is a false touch if a proportion of the number of the effective touch points in the first region to a number of total pixel points in the first region is less than a first threshold value or greater than a second threshold value, where the second threshold value is greater than the first threshold value.

Optionally, the reference data and the touch data may include data of a plurality of pixel points in the first region, where the plurality of the pixel points may be all or some of the pixel points in the first region.

Optionally, the plurality of the pixel points may be all of the pixel points in the first region. In this case, if a proportion of the effective touch points in the first region to the total pixel points satisfies a preset condition, it may be determined that the touch event is an effective finger touch/press. Otherwise, if the preset condition is not satisfied, it may be determined that the touch event is a false touch.

Optionally, the preset condition may specifically be being greater than the first threshold value and less than the second threshold value.

With reference to the foregoing possible implementation manners of the first aspect, in a third possible implementation manner of the first aspect, the coprocessor is configured to: determine an effective touch threshold value for the first region according to a touch numerical value of each of the plurality of the pixel points in the first region and a reference numerical value of each of the plurality of the pixel points; and determine that a first pixel point is an effective touch point if an absolute value of a difference between a touch numerical value of the first pixel point in the plurality of the pixel points and a reference numerical value of the first pixel point is greater than the effective touch threshold value for the first region.

With reference to the foregoing possible implementation manners of the first aspect, in a fourth possible implementation manner of the first aspect, the coprocessor is configured to: determine a parameter BR1 according to the following equation:

$$BR1 = \frac{\sum_{x,y} \text{abs}(B(x,y) - R(x,y))}{L},$$

where B(x, y) is a reference numerical value of a pixel point (x, y) in the first region, R(x, y) is a touch numerical value of the pixel point (x, y), abs( ) denotes calculating an absolute value, $\Sigma_{x,\ y}$ denotes calculating a sum for the plurality of the pixel points in the first region, and L is a number of the plurality of the pixel points; and determine the effective touch threshold value for the first region according to the parameter BR1.

With reference to the foregoing possible implementation manners of the first aspect, in a fifth possible implementation manner of the first aspect, the fingerprint sensing region further includes a second region; and the coprocessor is configured to: determine a number of effective touch points in the second region according to the touch data and the reference data; and determine that the touch event is a false touch if a proportion of the number of the effective touch points in the second region to a number of total pixel points in the second region is less than the first threshold value or greater than the second threshold value, and the proportion of the number of the effective touch points in the first region to the number of the total pixel points in the first region is less than the first threshold value or greater than the second threshold value.

Optionally, the reference data and the touch data may further include data of a plurality of pixel points in the second region.

Optionally, the coprocessor may determine whether a proportion of the effective touch points in the second region to the total pixel points of the second region satisfies the preset condition.

Optionally, if there is a region where the proportion of the effective touch points satisfies the preset condition in the first region and the second region, the coprocessor may determine that the touch event is an effective finger touch or an effective finger press; otherwise, if there is no region where the proportion of the effective touch points satisfies the preset condition in the first region and the second region, the coprocessor may determine that the touch event is a false touch.

Optionally, only when the portions of the effective touch points in each of the first region and the second region satisfy the preset condition, the coprocessor may determine that the touch event is an effective finger touch/press; otherwise, if there is a region where the proportion of the effective touch points does not satisfy the preset condition in the first region and the second region, the coprocessor may determine that the touch event is a false touch, but the embodiments of the present disclosure are not limited hereto.

Optionally, the electronic device further includes: a memory, configured to store the reference data of the fingerprint sensing region; and the coprocessor is configured to acquire the reference data from the memory.

With reference to the foregoing possible implementation manners of the first aspect, in a sixth possible implementation manner of the first aspect, the main processor is configured to acquire the reference data of the fingerprint sensing region from the fingerprint module, and store the reference data in the memory before the coprocessor acquires the touch data collected by the fingerprint module.

Optionally, the reference data may be collected by the main processor. In this case, the coprocessor and the main processor may share the memory.

With reference to the foregoing possible implementation manners of the first aspect, in a seventh possible implementation manner of the first aspect, the coprocessor is further configured to acquire the reference data of the fingerprint sensing region that is collected by the fingerprint module, and store the reference data in the memory before acquiring the touch data collected by the fingerprint module.

Optionally, the reference data may be collected by the coprocessor. In this case, the memory may be dedicated to the coprocessor, or may also be shared by the coprocessor and the main processor.

With reference to the foregoing possible implementation manners of the first aspect, in an eighth possible implementation manner of the first aspect, before acquiring the touch data collected by the fingerprint module, the coprocessor is further configured to: determine whether a touch position corresponding to the touch event is located in the fingerprint sensing region; and instruct the fingerprint module to collect the touch data if it is determined that the touch position corresponding to the touch event is located in the fingerprint sensing region.

Optionally, if it is determined that the touch event does not occur in the finger sensing region, that is, the touch position corresponding to the touch event is not located in the fingerprint sensing region, a touch event on the touch panel may be detected continuously.

With reference to the foregoing possible implementation manners of the first aspect, in a ninth possible implementation manner of the first aspect, the coprocessor is further configured to wake up the main processor when it is determined that the touch event is an effective finger touch/press.

Optionally, the main processor may be configured to determine a result of fingerprint identification that corresponds to the touch data.

Optionally, the coprocessor may store the touch data in the memory of the electronic device; correspondingly, the main processor may acquire the touch data stored in the memory, and perform fingerprint identification according to the touch data.

In an electronic device provided by the present application, a coprocessor determines whether a touch event is a false touch when the touch event on a touch panel is detected, and wakes up a main processor only when it is determined that the touch event is not a false touch, which may avoid the main processor from being woken up frequently due to false touches, thereby facilitating further reducing power consumption of the device, improving standby time of the device, and thus improving user experience.

According to a second aspect, a detection method is provided, including: detecting, by a coprocessor, a touch event on a touch panel, where the touch panel has a fingerprint sensing region; acquiring, by the coprocessor, touch data of the fingerprint sensing region that corresponds to the touch event if the touch event on the touch panel is detected; determining, by the coprocessor, whether the touch event is a false touch according to the touch data.

Optionally, the coprocessor may wake up a main processor if it is determined that the touch event is an effective finger touch/press.

Optionally, the coprocessor may detect a touch event on the touch panel continuously if it is determined that the touch event is a false touch.

In a first possible implementation manner of the second aspect, the determining, by the coprocessor, whether the touch event is the false touch according to the touch data includes: acquiring, by the coprocessor, reference data of the fingerprint sensing region, where the reference data is collected when the fingerprint sensing region is not touched; and determining, by the coprocessor, whether the touch event is a false touch according to the touch data and the reference data.

Optionally, the coprocessor may acquire the reference data from a memory.

With reference to the foregoing possible implementation manner of the second aspect, in a second possible implementation manner of the second aspect, the determining, by the coprocessor, whether the touch event is the false touch according to the touch data and the reference data includes: determining, by the coprocessor, a number of effective touch points in a first region according to the touch data and the reference data, where the first region is at least a part of the fingerprint sensing region; and determining, that the touch event is a false touch if a proportion of the number of the effective touch points in the first region to a number of total pixel points in the first region is less than a first threshold value or greater than a second threshold value, where the second threshold value is greater than the first threshold value.

Optionally, the reference data and the touch data may include data of each of a plurality of pixel points in the first region, where the plurality of the pixel points may be all or some of the pixel points in the first region.

With reference to the foregoing possible implementation manners of the second aspect, in a third possible implementation manner of the second aspect, the reference data includes a reference numerical value of each of the plurality of the pixel points in the first region, and the touch data includes a touch numerical value of each of the plurality of the pixel points in the first region; and the determining, by the coprocessor, the number of the effective touch points in the first region according to the touch data and the reference data includes: determining, by the coprocessor, an effective touch threshold value for the first region according to the touch numerical value of each of the plurality of the pixel points and the reference numerical value of each pixel point; and determining, by the coprocessor, that a first pixel point is an effective touch point if an absolute value of a difference between a touch numerical value of the first pixel point in the first region and a reference numerical value of the first pixel point is greater than the effective touch threshold value for the first region.

With reference to the foregoing possible implementation manners of the second aspect, in a fourth possible implementation manner of the second aspect, determining, by the coprocessor, the effective touch threshold value for the first region according to the touch numerical value of each pixel point in the first region and the reference numerical value of each pixel point in the first region includes: determining, by the coprocessor, a parameter BR1 according to the following equation, $$BR1 = \frac{\sum_{x,y} \mathrm{abs}(B(x,y) - R(x,y))}{L},$$

where $B(x, y)$ is a reference numerical value of a pixel point $(x, y)$ in the first region, $R(x, y)$ is a touch numerical value of the pixel point $(x, y)$, abs( ) denotes calculating an absolute value, $\Sigma_{x,y}$ denotes calculating a sum for the plurality of the pixel points in the first region, and L is a number of the plurality of the pixel points; and determining, by the coprocessor, the effective touch threshold value for the first region according to the parameter BR1.

With reference to the foregoing possible implementation manners of the second aspect, in a fifth possible implementation manner of the second aspect, the fingerprint sensing region further includes a second region; the method further includes: determining, by the coprocessor, a number of effective touch points in the second region according to the touch data and the reference data; and the determining, that the touch event is the false touch if the proportion of the number of the effective touch points in the first region to the number of the total pixel points in the first region is less than the first threshold value or greater than the second threshold value includes: determining, by the coprocessor, that the touch event is a false touch if a proportion of the number of the effective touch points in the second region to a number of total pixel points in the second region is less than the first threshold value or greater than the second threshold value, and the ratio of the number of the effective touch points in the first region to the number of the total pixel points in the first region is less than the first threshold value or greater than the second threshold value.

With reference to the foregoing possible implementation manners of the second aspect, in a sixth possible implementation manner of the second aspect, before acquiring, by the coprocessor, the touch data of the fingerprint sensing region of the touch panel that corresponds to the touch event, the method further includes: acquiring, by the coprocessor, the reference data of the fingerprint sensing region through a fingerprint module; and storing, by the coprocessor, the acquired reference data in a memory; and the acquiring, by the coprocessor, the reference data of the fingerprint sensing region includes: acquiring, by the coprocessor, the reference data of the fingerprint sensing region that is stored in the memory.

With reference to the foregoing possible implementation manners of the second aspect, in an seventh possible implementation manner of the second aspect, before acquiring, by the coprocessor, the touch data of the fingerprint sensing region of the touch panel that corresponds to the touch event, the method further includes: determining, by the coprocessor, whether a touch position corresponding to the touch event is located in the fingerprint sensing region; and instructing, by the coprocessor, the fingerprint module to collect the touch data of the fingerprint sensing region if it is determined that the touch position corresponding to the touch event is located in the fingerprint sensing region.

With reference to the foregoing possible implementation manners of the second aspect, in an eighth possible implementation manner of the second aspect, the method further includes: storing, by the coprocessor, the touch data in the memory if it is determined that the touch event is an effective finger touch/press.

According to a third aspect, a detection apparatus is provided, configured to execute a method in the foregoing first aspect or any possible implementation manner of the first aspect.

Specifically, the apparatus includes a unit for executing the method in the foregoing first aspect or any possible implementation manner of the first aspect.

According to a fourth aspect, a detection apparatus is provided, including: a memory and a processor, where the memory is configured to store an instruction, and the processor is configured to execute the instruction stored in the memory, and when the processor executes the instruction stored in the memory, the execution enables the processor to execute a method in the first aspect or any possible implementation manner of the first aspect.

According to a fifth aspect, a computer readable medium is provided, for storing a computer program, where the computer program includes an instruction for executing a method in the first aspect or any possible implementation manner of the first aspect.

According to a sixth aspect, a computer product is provided, for executing a method in the first aspect or any possible implementation manner of the first aspect.

DESCRIPTION OF EMBODIMENTS

A description of technical solutions of embodiments of the present disclosure will be given below, in combination with the accompanying drawings in the embodiments of the present disclosure.

Figure 1:
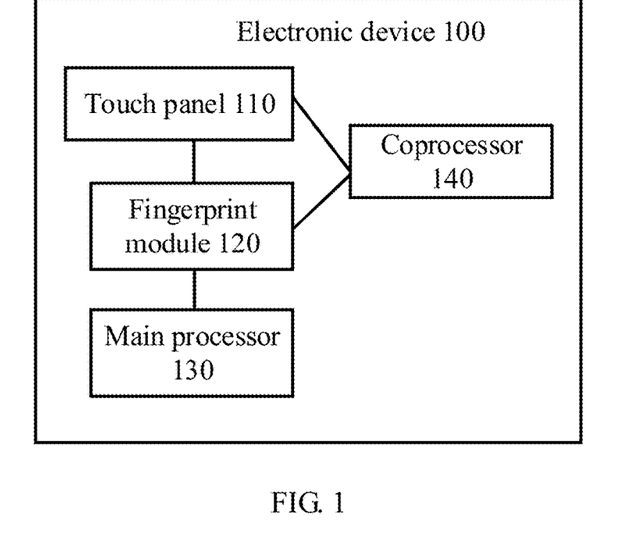
FIG. 1 is a schematic block diagram of an electronic device provided in an embodiment of the present disclosure.

FIG. 1 shows an electronic device 100 provided in an embodiment of the present disclosure; the electronic device 100 includes a touch panel 110, a fingerprint module 120, a main processor 130 and a coprocessor 140.

The touch panel 110 may have a fingerprint sensing region, and more particularly, an effective detection area of the fingerprint module 120 may be at least partially arranged in a touch region of the touch panel 110. For example, the fingerprint module 120 may be integrally arranged below the touch panel 110 so as to overlap with a part of the touch region of the touch panel 110; optionally, the region where the touch panel 110 covers the fingerprint module 120 may serve as the foregoing fingerprint sensing region, but the embodiment of the present disclosure does not make a limit hereof. A touch event for the fingerprint sensing region may trigger a process of fingerprint identification. Optionally, the fingerprint sensing region may be arranged to include a part of the touch region of the touch panel 110, which, for example, is located in an upper part or a lower part of the touch panel 110, or may also cover an entire touch region of the touch panel 110, but the embodiment of the present disclosure is not limited hereto.

As a specific embodiment, the touch panel 110 may be a touch display screen integrating touch detection and display functions, which, for example, may include a touch sensor and a display panel; optionally, the touch sensor may be disposed above the display panel in an add-on way, partially integrated in the display panel, or wholly integrated in the display panel. Optionally, a touch region of the touch sensor and a display region of the display panel may at least partially overlap with each other. The effective detection area of the fingerprint module 120 may be located in the display region of the display panel by using, for example, an in display or under display structure, so as to implement a function of in display (In display) fingerprint detection or a function of under display (Under display) fingerprint detection. Optionally, the fingerprint module 120 may include a fingerprint sensor, and the fingerprint sensor may be a capacitive fingerprint sensor, an ultrasonic fingerprint sensor, or an optical fingerprint sensor. The fingerprint module 120 may reuse part of functions of the display panel when employing an optical fingerprint sensor. For example, some display pixels of the display panel may serve as a light source of the optical fingerprint sensor, but the embodiment of the present disclosure is not limited hereto.

The fingerprint module 120 may be configured to collect data of a plurality of pixel points of the touch panel 110, for example, pixel points located in at least a part of the touch region of the touch panel 110. As an example, the fingerprint module 120 may be configured to collect data of the fingerprint sensing region of the touch panel 110. Optionally, the data may include a numerical value of each of a plurality of pixel points in the fingerprint sensing region, the numerical value may be a capacitance parameter value, an optical parameter value or another value, but the embodiment of the present disclosure is not limited hereto.

To facilitate understandings, hereinafter, a numerical value collected by the fingerprint module 120 when a pixel point is touched/pressed is referred to a touch numerical value, a numerical value collected by the fingerprint module 120 when the pixel point is not touched/pressed is referred to a reference numerical value, but the embodiment of the present disclosure is not limited hereto.

In the embodiment of the present disclosure, on the basis of including the main processor 130, the electronic device 100 may further determine touch/press detection of the touch panel 110 through the coprocessor 140 to implement reduction of overall power consumption of the device, where optionally, the main processor 130 may specifically be an application processor (Application Processor, AP), and the coprocessor 140 may specifically be a micro controller unit (Micro Controller Unit, MCU), but the embodiment of the present disclosure is not limited hereto.

Optionally, the coprocessor 140 may detect a touch/press event of the touch panel 110, and determine whether the touch/press event is a false touch or an effective finger touch/press. The coprocessor 140 may detect the touch/press event of the touch panel 110 only when the main processor 130 is in a dormant state (that is, in a low frequency and low power consumption mode), or may also detect the touch/press event of the touch panel 110 when the main processor 130 is in a dormant state or in a working state. For example, if the touch panel 110 of the electronic device 100 is off, the main processor 130 may enter into a dormant state, the coprocessor 140 starts the detection of the touch/press event of the touch panel 110, but the embodiment of the present disclosure is not limited hereto.

Optionally, the coprocessor 140 may terminate processing of the touch/press event if it is determined that the touch/press event is a false touch, and continue to detect a touch event on the touch panel 110. Optionally, the coprocessor 140 may wake up the main processor 130 to execute the process of fingerprint identification if it is determined that the touch/press event is an effective finger touch/press; that is to say, the coprocessor 140 wakes up the main processor 130 only when it is determined that the touch/press event is not a false touch, which can avoid the main processor 130 from being woken up frequently due to the false touch, thereby facilitating further reducing power consumption of the device, improving standby time of the device, and improving user experience.

Furthermore, an electronic device 100 provided in the embodiment of the present disclosure includes a main processor 130 and a coprocessor 140, and the coprocessor 140 detects a touch/press event of a touch panel 110 when the main processor 130 is in a dormant state, thereby implementing fingerprint detection with low power consumption when a fingerprint module 120 does not have a function of finger detection and a system is in a dormant state.

Figure 2:
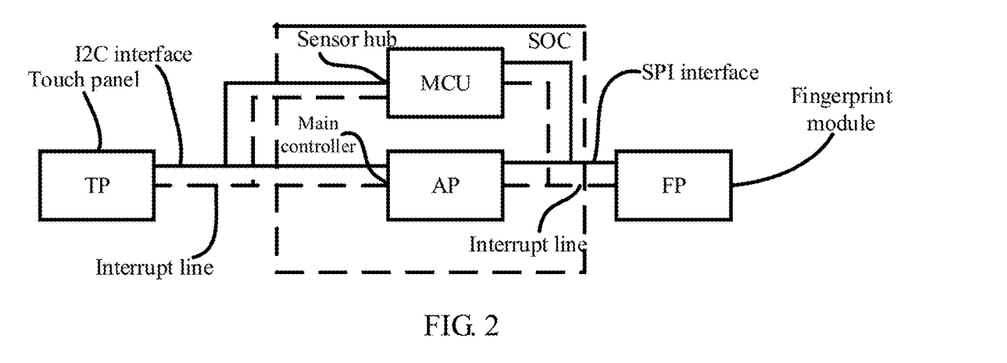
FIG. 2 is a schematic structural diagram of an electronic device provided in an embodiment of the present disclosure.

FIG. 2 exemplarily shows a schematic diagram of an architecture example of an electronic device 100 provided in an embodiment of the present disclosure; the electronic device 100 may include a touch panel (Touch Panel, TP) 110, an AP, an MCU and a fingerprint module 120 (Fingerprint Module, FP). Specifically, the touch panel 110 may include a capacitive touch sensor or a resistive touch sensor. The fingerprint module 120 may specifically include an optical fingerprint sensor, a capacitive fingerprint sensor, or an ultrasonic fingerprint sensor. The AP may serve as a main controller, mainly responsible for most of system computing work. The MCU may serve as a sensor hub (Sensor Hub), which may acquire, integrate and process data from different sensors (such as the foregoing touch sensor and/or finger sensor). The MCU and the AP may have capability to access a memory (for example, a dynamic random access memory (Dynamic Random Access Memory, DRAM)) of the electronic device 100.

Optionally, as shown in FIG. 2, the AP and the MCU may be connected with the fingerprint module 120 through a same serial peripheral interface (Serial Peripheral Interface, SPI) bus, and may be connected with the touch panel 110 through a same inter-integrated circuit (Inter-Integrated Circuit, I2C) bus. Optionally, the AP and the MCU may also be connected with the TP through a same interrupt line, and/or be connected with the FP through the same interrupt line. Optionally, the AP and the MCP may be devices independent from each other; alternatively, the AP and the MCP may also be integrated in a system on a chip (System On a Chip, SOC), but the embodiment of the present disclosure is not limited hereto.

Figure 3:
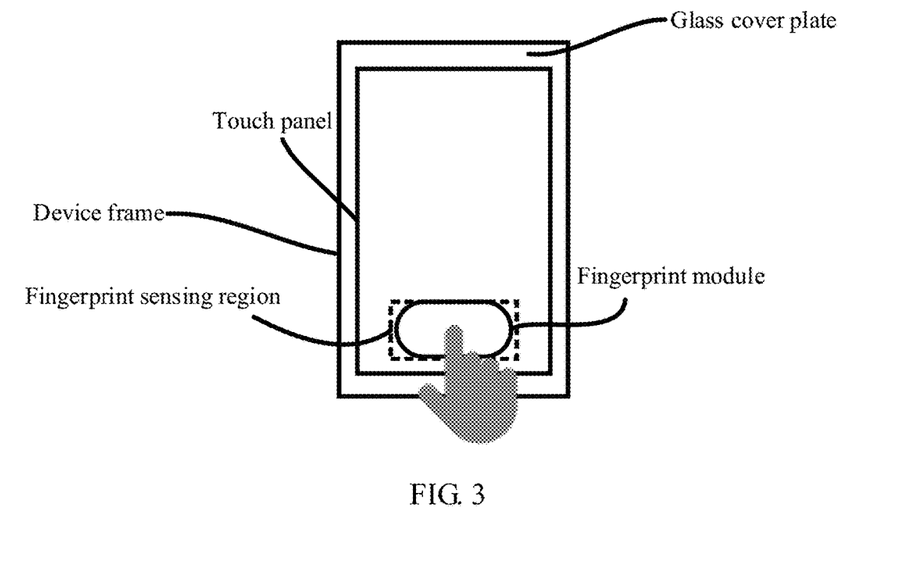
FIG. 3 is a front view of an example of an electronic device provided in an embodiment of the present disclosure.

FIG. 3 is a front view of an example of an electronic device 100 provided in an embodiment of the present disclosure. The electronic device 100 may specifically be a smart phone, a tablet computer or another intelligent mobile terminal, which includes a touch panel 100 having a fingerprint sensing region, a fingerprint module 120 located below the touch panel 110, a glass cover plate located above the touch panel 110 and a device frame, but the embodiment of the present disclosure is not limited hereto.

In the embodiment of the present disclosure, a coprocessor 140 may detect a touch/press event on the touch panel 110 in a variety of ways. Optionally, the MCU may determine presence of a touch event on the touch panel 110 by interrupt pin or I2C interface polling, but the embodiment of the present disclosure is not limited hereto.

In the embodiment of the present disclosure, the coprocessor 140 may determine whether the detected touch/press event is a false touch in a variety of ways. As an optional embodiment, the coprocessor 140 may acquire touch data collected by a fingerprint module 120 that corresponds to the touch/press event, and determine whether the touch/press event is a false touch according to the touch data. Optionally, the touch data may be collected by the fingerprint module 120 after the coprocessor 140 determines the presence of the touch/press event. For example, the coprocessor 140 may instruct the fingerprint module 120 to collect the touch data corresponding to the touch/press event when it is determined that the presence of the touch/press event on the touch panel 110, but the embodiment of the present disclosure is not limited hereto.

As another optional embodiment, if the fingerprint module 120 is configured to collect data of the fingerprint sensing region, the coprocessor 140 may determine whether the touch/press event is a touch/press in the fingerprint sensing region, that is, determine whether a touch position of the touch/press event is located in the fingerprint sensing region, when the touch/press event is detected. Optionally, if it is determined that the touch position is located in the fingerprint sensing region, the fingerprint module 120 may be instructed to perform collection of the touch data. Optionally, if the touch position is not located in the fingerprint sensing region, processing of the touch/press event may be terminated, but the embodiment of the present disclosure is not limited hereto.

In the embodiment of the present disclosure, optionally, the coprocessor 140 may determine a change in parameters (such as a change in capacitance parameters or optical parameters) of a plurality of pixel points of the touch panel 110 before and after the touch/press event occurs according to the touch data collected by the fingerprint module 120, and determine whether the touch/press event is a false touch according to the change in parameters. For example, the coprocessor 140 may acquire reference data corresponding to the touch data, and determine whether the touch/press event is a false touch according to the touch data and the reference data. The reference data may correspond to a same set of pixel points as the touch data, and the reference data is collected when a pixel point in the set of the pixel points is not touched. For example, the reference data may include reference numerical values of a plurality of pixel points in the fingerprint sensing region, the reference data is collected when the fingerprint sensing region is not touched, but the embodiment of the present disclosure is not limited hereto.

In the embodiment of the present disclosure, the reference data may be pre-acquired by the coprocessor 140 or a main processor 130 and stored in a memory. For example, when it is determined that the plurality of the pixel points of the display panel are not touched/pressed, the main processor or the coprocessor may instruct the fingerprint module to collect data of the plurality of the pixel points of the touch panel (such as the plurality of the pixel points in the fingerprint sensing region), and acquire the data collected by the fingerprint module according to the instruction. In this case, the coprocessor 140 may acquire the stored reference data from the memory. As an example, the main processor 130 may pre-acquire a reference numerical value of each of the plurality of the pixel points from the fingerprint module, and store the acquired reference data in a memory shared with the coprocessor 140 when being in a working state. As another example, the coprocessor 140 may pre-acquire the reference data from the fingerprint module, and store the acquired reference data in a memory dedicated to the coprocessor 140 or a memory shared with the main processor 130, but the embodiment of the present disclosure is not limited hereto.

Optionally, the main processor 130 or the coprocessor 140 may determine whether a touch/press event occurs on the touch panel 110, or determine whether a touch/press event occurs in a specific region (such as a fingerprint sensing region) of the touch panel 110. Optionally, if it is determined that there is a touch/press event, the detection may continue until it is determined that there is no touch/press event on the touch panel 110 or in the specific region of the touch panel 110. Optionally, if it is determined that there is no touch/press event, the reference data may be collected by the fingerprint module 120, but the embodiment of the present disclosure is not limited hereto.

Optionally, the coprocessor 140 may determine whether the touch/press event is a false touch by comparing the touch data with the reference data corresponding to the touch data. For example, the coprocessor 140 may determine effective touch points in the plurality of the pixel points by comparing touch numerical values and reference numerical values of some or all of the plurality of the pixel points, and determine whether the touch/press event is a false touch according to a proportion of the effective touch points in the plurality of the pixel points.

As an example, the coprocessor 140 may determine a number of effective touch points in a first region by comparing a touch numerical value and a reference numerical value of each pixel point in the first region of the fingerprint sensing region, and determine whether the touch/press event is a false touch or an effective finger touch/press according to a fact whether the proportion of the effective touch points in the first region in total pixel points in the first region satisfies a preset condition. Optionally, the first region may be a part of the fingerprint sensing region, or may be all of the fingerprint sensing region, but the embodiment of the present disclosure is not limited hereto. The preset condition may be a protocol-defined condition, or be pre-specified by a user. For example, the present condition may be being greater than a first threshold value and less than a second threshold value, but the embodiment of the present disclosure is not limited hereto.

Optionally, the coprocessor 140 may determine the number of the effective touch points of the first region in a variety of ways. As an example, the coprocessor 140 may determine an effective touch threshold value for the first region according to the touch numerical value and the reference numerical value of each pixel point in the first region. For example, the effective touch threshold value may a function of a parameter BR1 determined by the following equation:

$$BR1 = \frac{\sum_{x,y} abs(B(x, y) - R(x, y))}{L} \quad (1)$$

where B(x, y) is a reference numerical value of a pixel point (x, y) in the first region, R(x, y) is a touch numerical value of the pixel point (x, y), abs( ) denotes calculating an absolute value, $\Sigma_{x, y}$ denotes calculating a sum for the plurality of the pixel points in the first region, and L is a number of the plurality of the pixel points. Optionally, the plurality of the pixel points may be all or some of the pixel points of the first region, but the embodiment of the present disclosure is not limited hereto.

Optionally, the effective touch threshold value TH1 may be equal to the BR1, or may be obtained by calculating the BR1, and the embodiment of the present disclosure is not limited hereto. The coprocessor 140 may determine whether an absolute value of a difference between the touch numerical value and the reference numerical value of each pixel point in the first region exceeds the effective touch threshold value. Optionally, if the effective touch threshold value is exceeded, the coprocessor 140 may determine that the pixel point is an effective touch point. Otherwise, if the effective touch threshold value is not exceeded, the coprocessor 140 may determine that the pixel point is not an effective touch point, but the embodiment of the present disclosure is not limited hereto.

It should be understood that, in the foregoing examples, it is assumed that the touch data and the reference data include a numerical value of each pixel point in the first region, respectively; optionally, the touch data and the reference data may also only include numerical values of some of the pixel points in the first region, and a corresponding method for determining a false touch is similar with the foregoing embodiment, which will not be repeated redundantly herein for brevity.

Through the foregoing process, the coprocessor 140 may determine a false touch event according to the processing of the data of the pixel points in the first region. Optionally, if the first region is a part of the fingerprint sensing region, and the fingerprint sensing region further includes a second region, for example, the fingerprint sensing region consists of the first region and the second region. As an example, the coprocessor 140 may execute the foregoing process of the first region for the second region to determine whether a proportion of effective touch points in the second region in total pixel points of the second region satisfies the preset condition. Optionally, if there is a region where the proportion of the effective touch points satisfies the preset condition in the first region and the second region, the coprocessor 140 may determine that the touch/press event is an effective finger touch/press; otherwise, if there is no region where the proportion of the effective touch points satisfies the preset condition in the first region and the second region, the coprocessor 140 may determine that the touch/press event is a false touch. Alternatively, only if the proportions of the effective touch points in each of the first region and the second region satisfy the preset condition, the coprocessor 140 determines that the touch/press event is an effective finger touch/press; otherwise, if there is a region where the proportion of the effective touch points does not satisfy the preset condition in the first region and the second region, the coprocessor 140 may determine that the touch/press event is a false touch, but the embodiment of the present disclosure is not limited hereto.

Optionally, if the coprocessor 140 determines that the touch/press event is not a false touch event, that is, the touch/press event is an effective finger touch/press, the coprocessor may wake up the main processor 130 so as to enable the main processor 130 to perform fingerprint identification. For example, the coprocessor 140 may wake up the main processor 130 by writing a specific register, but the embodiment of the present disclosure is not limited hereto.

Optionally, the coprocessor 140 may further store the touch data in the memory of the electronic device 100 as fingerprint collection data; correspondingly, the main processor 130 may acquire the fingerprint collection data from the memory, and perform fingerprint identification according to the fingerprint collection data, but the embodiment of the present disclosure is not limited hereto.

In the embodiment of the present disclosure, the electronic device 100 may specifically be a terminal device, such as a mobile phone, a tablet computer, or the like, and the embodiment of the present disclosure is not limited hereto.

Figure 4:
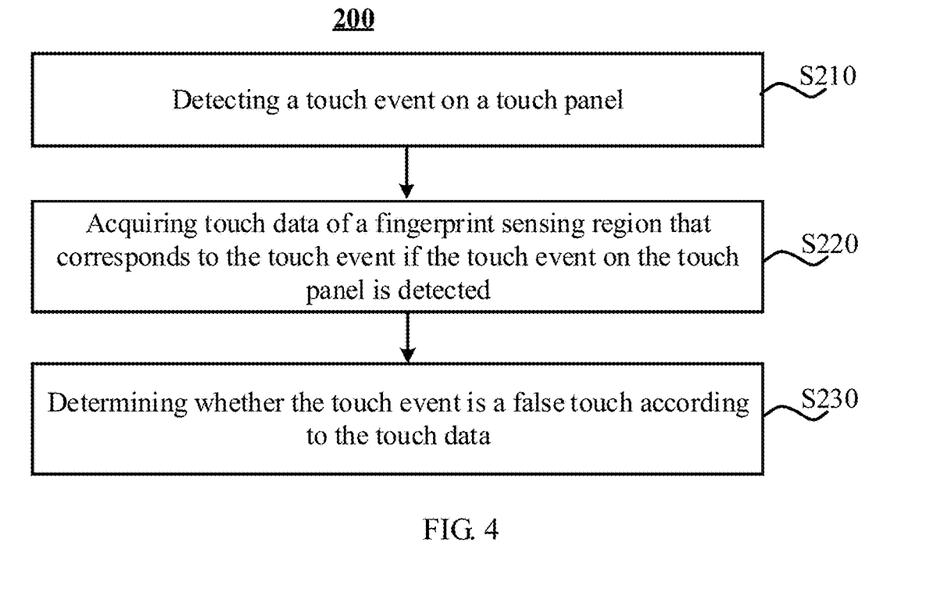
FIG. 4 is a schematic flowchart diagram of a detection method provided in an embodiment of the present disclosure.

FIG. 4 shows a detection method 200 provided in an embodiment of the present disclosure. The detection method 200 may be applied to an electronic device, such as the electronic device of the foregoing embodiment, but the embodiment of the present disclosure is not limited hereto.

S210, a touch event on a touch panel is detected.

Optionally, the touch event on the touch panel may be detected by an interrupt pin or by interface polling.

S220, touch data is acquired if the touch event on the touch panel is detected, the touch data is collected in a fingerprint sensing region by a fingerprint module that corresponds to the touch event.

Optionally, the touch data of the fingerprint sensing region may be acquired from the fingerprint module.

Optionally, if the touch event on the touch panel is detected, the fingerprint module may be instructed to collect data of the fingerprint sensing region, and the data collected by the fingerprint module according to the instruction is received; the received data is taken as the touch data corresponding to the touch event.

S230, whether the touch event is a false touch is determined according to the touch data.

At S230, whether the touch event is a false touch or an effective finger touch or press may be determined according to the touch data. Optionally, if it is determined that the touch event is an effective finger touch or press, a main processor may be woken up. For example, the main processor may be woken up by writing a specific register, but the embodiment of the present disclosure is not limited hereto. Optionally, if it is determined that the touch event is a false touch, a touch event on the touch panel may be detected continuously. In this case, the main processor may be avoided from being woken up frequently due to false touches, thereby saving power consumption of the device, improving endurance capability, and further improving user experience.

Optionally, if it is determined that the touch event is an effective finger touch or an effective finger press, the touch data may be stored in a memory as fingerprint collection data, so that the main processor may acquire the fingerprint collection data from the memory, and perform fingerprint identification according to the fingerprint collection data, but the embodiment of the present disclosure is not limited hereto.

Optionally, S230, whether the touch event is a false touch is determined according to the touch data, includes:

reference data of the fingerprint sensing region is acquired from the memory, where the reference data is pre-collected by the fingerprint module when the fingerprint sensing region is not touched, and is stored in the memory in advance;

whether the touch event is a false touch is determined according to the touch data and the reference data.

Optionally, the reference data and the touch data may include data of all of pixel points in the fingerprint sensing region, or may include only data of some of the pixel points in the fingerprint sensing region, but the embodiment of the present disclosure is not limited hereto.

Optionally, the reference data and the touch data may include data of all or some of the pixel points in a first region, where the first region may be at least a part of the fingerprint sensing region. In this case, a number of effective touch points in the first region may be determined according to the touch data and the reference data, where whether the touch event is a false touch is determined by determining whether a proportion of the effective touch points in the first region in total pixel points in the first region satisfies a preset condition. Optionally, the preset condition may be being greater than a first threshold value and less than a second threshold value, where the second threshold value is greater than the first threshold value, but the embodiment of the present disclosure is not limited hereto.

Optionally, if the proportion of the number of the effective touch points in the first region in the total pixel points in the first region does not satisfy the preset condition, it may be determined that the touch event is a false touch. Optionally, if the proportion of the number of the effective touch points in the first region in the total pixel points in the first region satisfies the preset condition, it may be determined that the touch event is not a false touch.

As another optional embodiment, if the touch data and the reference data further include data of a plurality of pixel points of each second region in at least one second region, it may be further determined whether a proportion of effective touch points of each second region in the at least one second region in total pixel points of each second region in the at least one second region satisfies the preset condition. In this case, as an example, if there is a region where the proportion of the effective touch points satisfies the present condition in the at least one second region and the first region, it may be determined that the touch event is an effective finger touch/press. Correspondingly, if the proportions of the effective touch points of all regions in the at least one second region and the first region do not satisfy the present condition, it may be determined that the touch event is a false touch.

In this case, optionally, a step that if a proportion of the number of the effective touch points in the first region to a number of the total pixel points in the first region does not satisfy the preset condition, it may be determined that the touch event is a false touch, may include:

whether the proportion of the effective touch points in the at least one second region satisfies the preset condition may be determined if the proportion of the effective touch points in the first region does not satisfy the present condition;

the touch event is a false touch may be determined if there is no second region where the proportion of the effective touch points satisfies the present condition in the at least one second region.

As an example, if the proportions of the effective touch points of all regions in the at least one second region and the first region satisfy the present condition, it may be determined that the touch event is an effective finger touch/press. Correspondingly, if there is a region where the proportion of the effective touch points does not satisfy the present condition in the at least one second region and the first region, it may be determined that the touch event is a false touch.

In this case, optionally, a step that if the proportion of the number of the effective touch points in the first region to the total pixel points in the first region does not satisfy the preset condition, it is determined that the touch event is a false touch, may include:

whether the proportion of the effective touch points in the at least one second region satisfies the preset condition may be determined if the proportion of the effective touch points in the first region does not satisfy the present condition;

the touch event is a false touch may be determined if there is a second region where the proportion of the effective touch points does not satisfy the present condition in the at least one second region.

Optionally, before acquiring the touch data of the fingerprint sensing region that corresponds to the touch event, the method further includes:

the reference data of the fingerprint sensing region is acquired through the fingerprint module;

the acquired reference data is stored in the memory.

In this case, in the process of determining a false touch, the reference data of the fingerprint sensing region stored by the memory may be acquired.

Optionally, before acquiring the touch data of the fingerprint sensing region of the touch panel that corresponds to the touch event, the method further includes:

whether a touch position corresponding to the touch event is located in the fingerprint sensing region is determined.

the fingerprint module is instructed to collected the touch data of the fingerprint sensing region if it is determined that the touch position corresponding to the touch event is located in the fingerprint sensing region.

A method provided in an embodiment of the present disclosure will be described below with reference to a specific example. In the following example, it is assumed that data collected by a fingerprint module includes a numerical value of each of X*Y pixel points in a fingerprint sensing region.

If a touch event in the fingerprint sensing region is detected by an MCU, touch data {R(1,1), . . . , R(1,Y), . . . , R(x,1), . . . , R(x,Y), . . . , R(X,1), . . . , R(X,Y)}, which is collected by an fingerprint module, is read through an SPI interface.

The MCU acquires reference data {B(1,1), . . . , B(1,Y), . . . , B(x,1), . . . , B(x,Y), . . . , B(X,1), . . . , B(X,Y)} from a storage area of a DRAM shared with an AP.

The MCU divides the fingerprint sensing region into four regions, {(1,1), . . . , (X/2,Y/2)}, {(X/2+1,1), . . . , (X, Y/2)}, {(1,Y/2+1), . . . , (X/2,Y)} and {(X/2+1, Y/2+1), . . . , (X,Y)}, and calculates threshold values TH1~TH4 of the four regions:

$$TH1 = \frac{X \times Y}{12} \times \sum_{x=1, y=1}^{x=X/2, y=Y/2} abs(B(x, y) - R(x, y)) \quad (2)$$

$$TH2 = \frac{X \times Y}{12} \times \sum_{x=X/2+1, y=1}^{x=X, y=Y/2} abs(B(x, y) - R(x, y)) \quad (3)$$

$$TH3 = \frac{X \times Y}{12} \times \sum_{x=1, y=Y/2+1}^{x=X/2, y=Y} abs(B(x, y) - R(x, y)) \quad (4)$$

$$TH4 = \frac{X \times Y}{12} \times \sum_{x=X/2, y=Y/2+1}^{x=X, y=Y} abs(B(x, y) - R(x, y)) \quad (5)$$

The MCU compares an absolute value abs(B(x,y)−R(x,y)) of a difference between a reference value and an original value of each pixel point with a threshold value of a region to which the pixel point belongs, and it is determined that the pixel point is an effective touch point if the absolute value of the difference between the reference value and the original value of the pixel point is less than the threshold value, otherwise it is an noneffective touch point.

It is determined that the detected touch event is an effective finger touch/press if a number of the effective touch points of each region is greater than X*Y*0.3/4 (a first threshold value) and less than X*Y*0.7/4 (a second threshold value), otherwise it is determined that the detected touch event is a false touch.

It should be understood that the foregoing description is to help those skilled in the art to better understand the embodiments of the present disclosure, rather than to limit the scope of the embodiments of the present disclosure. Those skilled in the art may obviously perform, according to the provided examples, various equivalent amendment or changes, which also fall in the scope of the embodiments of the present disclosure.

It should be understood that, values of sequence numbers of the foregoing various processes do not mean an order of execution which should be determined based upon functionalities and internal logics thereof, rather than setting any limitation to implementation of the embodiments of the present disclosure.

An embodiment of the present disclosure further provides a detection apparatus, configured to execute the method of the foregoing embodiment. Optionally, the detection apparatus may include units for executing processes and/or steps of the foregoing embodiments.

An embodiment of the present disclosure further provides a detection apparatus, including a processor and a memory, where the memory is configured to store an instruction, the processor is configured to execute the instruction stored in the memory, and the execution of the instruction enables the processor to execute the detection method of the foregoing embodiment.

An embodiment of the present disclosure further provides a processor, configured to execute the method of the foregoing embodiment.

An embodiment of the present disclosure further provides a computer product, configured to execute the method of the foregoing embodiment.

An embodiment of the present disclosure further provides a computer readable medium, for storing a computer program, where the computer program includes a method for executing processes and/or steps of the method of the foregoing embodiment.

It should be understood that, in the present embodiments of the present disclosure, the term "unit" may refer to an application specific integrated circuit (Application Specific Integrated Circuit, ASIC), an electronic circuit, a processor (such as a shared processor, a dedicated processor or a group processor) and memory for executing one or more software or hardware programs, a cooperative logic circuit and/or other suitable components that support the described functionalities.

In an optional example, those skilled in the art can understand that, an apparatus may specifically be an apparatus in the foregoing embodiments, and the apparatus may be configured to execute each process and/or step corresponding to the apparatus in the foregoing method embodiments, which is not repeated redundantly herein in order to avoid repetition.

It should be understood that, in the embodiments of the present disclosure, a processor may be a central processing unit (Central Processing unit, CPU), and the processor may also be another general-purpose processor, a digital uplink signal processor (DSP), an application-specific integrated circuit (ASIC), a field-programmable gate array (FPGA) or another programmable logic device, a discrete gate or a transistor logic device, a discrete hardware component or the like. The general-purpose processor may be a microprocessor or the processor may be any conventional processor or the like.

The memory may include a read-only memory and a random access memory, for providing instructions and data for the processor. A part of the memory may further include a non-volatile random access memory. For example, the memory may further store information about a type of a device. The processor may be configured to execute an instructions stored in the memory, and the processor may execute each step corresponding to the terminal devices in the foregoing method embodiments when executing the instruction.

In an implementation process, each step of the foregoing method may be completed by an integrated logic circuit of hardware or instructions in a software form in the processor. A step of a method disclosed in an embodiment of the present disclosure may be directly executed by a hardware processor, or executed by a combination of a hardware and a software module in a processor. The software module may be located in a mature storage media in the art, such as a random access memory, a flash memory, a read-only memory, a programmable read-only memory or an electrically erasable programmable memory, a register. The storage medium is located in a memory, and a processor executes an instruction in the memory and completes the steps of the method in combination with hardware thereof. They are not described in detail herein in order to avoid repetition.

It should be understood that, the foregoing description of the embodiments of the present disclosure focuses on differences between various embodiments, the same or similarities not mentioned may refer to each other, which will not be repeated herein for brevity.

Furthermore, in this description, the terms "system" and "network" are often used interchangeably. The term "and/or" herein merely describes association relations between associated objects, and expresses three relations, for example, A and/or B may expresses three conditions, namely A exists separately, A and B exist simultaneously and B exists separately. In addition, the character "/" herein generally represents an "or" relationship of two associated objects before and after the character.

Those of ordinary skill in the art may be aware that, units and algorithm steps of the examples described in the embodiments disclosed in this description may be implemented by electronic hardware, computer software, or a combination of the two. Whether these functions are executed in hardware or software mode depends on the specific applications and design constraint conditions of the technical solution. Those skilled may implement the described functions by using different methods for each specific application, but this implementation should not be considered to be beyond the scope of the present disclosure.

Those skilled in the art to which the present disclosure pertains may clearly understand that, for convenience and simplicity of description, the specific working processes of the system, the apparatus and the units described above, may refer to corresponding processes in the foregoing method embodiments, and will not be repeated redundantly herein.

In the several embodiments provided in the present application, it should be understood that, the disclosed system, device and method may be implemented in other manners. For example, the apparatus embodiments described above are merely exemplary, e.g., the division of the units is merely a logic function division, other division manners may exist in practical implementation, for example, a plurality of units or components may be combined or integrated to another system, or some features may be omitted or not implemented. From another point of view, the displayed or discussed mutual coupling or direct coupling or communication connection may be indirect coupling or communication connection via some interfaces, apparatuses or units, and may be in electrical, mechanical or other forms.

The units described as separate parts may be or may not be separated physically, and a component displayed as a unit may be or may not be a physical unit, namely, may be located in one place, or may be distributed on a plurality of network units. A part of or all of the units may be selected to achieve the purposes of the solutions in the present embodiments according to actual demands.

In addition, the respective functional units in the respective embodiments of the present disclosure may be integrated in one processing unit, or the respective units singly exist physically, or two or more units are integrated in one unit.

If the functions is implemented in the form of the software functional unit and is sold or used as an independent product, it may be stored in a computer readable storage medium. Based on such understanding, the technical solution of the present disclosure substantially, or the part of the present disclosure making contribution to the prior art, or a part of the technical solution may be embodied in the form of a software product, and the computer software product is stored in a storage medium, which includes multiple instructions enabling computer equipment (which may be a personal computer, a server, network equipment or the like) to execute all of or part of the steps in the methods of the embodiments of the present disclosure. The preceding storage medium includes various mediums that can store program codes, such as, a U disk, a removable hard disk, a read-only memory (Read-Only Memory, ROM), a random access memory (Random Access Memory, RAM), a magnetic disk, an optical disk, or the like.

Described above are the specific embodiments of the present application only, but the protection scope of the present application is not limited thereto, those skilled who are familiar with the art could readily think of variations or substitutions within the technical scope disclosed by the present application, and these variations or substitutions shall fall within the protection scope of the present application. Therefore, the protection scope of the present application should be determined with reference to the protection scope of the claims.

What is claimed is:

1. An electronic device, comprising:
   a touch panel having a fingerprint sensing region;
   a fingerprint module;
   a main processor; and
   a coprocessor;
   wherein the coprocessor is configured to detect a touch event on the touch panel;
   the fingerprint module is configured to collect touch data of the fingerprint sensing region that corresponds to the detected touch event;
   the coprocessor is further configured to acquire the touch data collected by the fingerprint module, and determine whether the touch event is a false touch according to the touch data, when the touch event is an effective finger touch, store the touch data in a memory of the electronic device and wake up the main processor; and
   the main processor is configured to acquire the touch data stored in the memory, and perform fingerprint identification according to the touch data.

2. The electronic device according to claim 1, wherein the coprocessor is configured to:
   acquire reference data of the fingerprint sensing region, wherein the reference data is collected when the fingerprint sensing region is not touched; and
   determine whether the touch event is a false touch according to the touch data and the reference data.

3. The electronic device according to claim 2, wherein the coprocessor is configured to:
   determine a number of effective touch points in a first region according to the touch data and the reference data, wherein the first region is at least a part of the fingerprint sensing region; and
   determine that the touch event is a false touch if a proportion of the number of the effective touch points in the first region to a number of total pixel points in the first region is less than a first threshold value or greater than a second threshold value, wherein the second threshold value is greater than the first threshold value.

4. The electronic device according to claim 3, wherein the reference data comprises a reference numerical value of each of a plurality of pixel points in the first region, and the touch data comprises a touch numerical value of each of the plurality of the pixel points in the first region; and the coprocessor is configured to:
determine an effective touch threshold value for the first region according to the touch numerical value of each of the plurality of the pixel points and the reference numerical value of each of the plurality of the pixel points; and
determine that a first pixel point is an effective touch point if an absolute value of a difference between a touch numerical value of the first pixel point in the plurality of the pixel points and a reference numerical value of the first pixel point is greater than the effective touch threshold value for the first region.

5. The electronic device according to claim 4, wherein the coprocessor is configured to:
determine a parameter BR1 according to the following equation:

$$BR1 = \frac{\sum_{x,y} \text{abs}(B(x, y) - R(x, y))}{L}$$

wherein B(x, y) is a reference numerical value of a pixel point (x, y) in the first region, R(x, y) is a touch numerical value of the pixel point (x, y), abs( ) denotes calculating an absolute value, $\Sigma_{x,y}$ denotes calculating a sum for the plurality of the pixel points in the first region, and L is a number of the plurality of the pixel points; and
determine the effective touch threshold value for the first region according to the parameter BR1.

6. The electronic device according to claim 3, wherein the fingerprint sensing region further comprises a second region; and
the coprocessor is configured to:
determine a number of effective touch points in the second region according to the touch data and the reference data; and
determine that the touch event is a false touch if a proportion of the number of the effective touch points in the second region to a number of total pixel points in the second region is less than the first threshold value or greater than the second threshold value, and the proportion of the number of the effective touch points in the first region to the number of the total pixel points in the first region is less than the first threshold value or greater than the second threshold value.

7. The electronic device according to claim 2, wherein the electronic device further comprises a memory, configured to store the reference data of the fingerprint sensing region;
the main processor is configured to acquire the reference data of the fingerprint sensing region from the fingerprint module, and store the reference data in the memory before the coprocessor acquires the touch data collected by the fingerprint module; and
the coprocessor is configured to acquire the reference data from the memory.

8. The electronic device according to claim 2, wherein the electronic device further comprises a memory, configured to store the reference data of the fingerprint sensing region;
the coprocessor is configured to acquire the reference data from the memory; and
the coprocessor is further configured to acquire the reference data of the fingerprint sensing region that is collected by the fingerprint module, and store the reference data in the memory before acquiring the touch data collected by the fingerprint module.

9. The electronic device according to claim 1, wherein before acquiring the touch data collected by the fingerprint module, the coprocessor is further configured to:
determine whether a touch position corresponding to the touch event is located in the fingerprint sensing region; and
instruct the fingerprint module to collect the touch data if it is determined that the touch position corresponding to the touch event is located in the fingerprint sensing region.

10. A detection method, applied to an electronic device, wherein the electronic device comprises a touch panel having a fingerprint sensing region, a fingerprint module, a main processor and a coprocessor; and the method comprises:
detecting, by the coprocessor, a touch event on the touch panel;
acquiring, by the coprocessor, touch data corresponding to the touch event that is collected on the fingerprint sensing region by the fingerprint module if the touch event on the touch panel is detected;
determining, by the coprocessor, whether the touch event is a false touch according to the touch data;
when the touch event is an effective finger touch, storing, by the coprocessor, the touch data in a memory, and waking up, by the coprocessor, the main processor.

11. The method according to claim 10, wherein the determining, by the coprocessor, whether the touch event is the false touch according to the touch data comprises:
acquiring, by the coprocessor, reference data of the fingerprint sensing region, wherein the reference data is collected when the fingerprint sensing region is not touched; and
determining, by the coprocessor, whether the touch event is a false touch according to the touch data and the reference data.

12. The method according to claim 11, wherein the determining, by the coprocessor, whether the touch event is the false touch according to the touch data and the reference data comprises:
determining, by the coprocessor, a number of effective touch points in a first region according to the touch data and the reference data, wherein the first region is at least a part of the fingerprint sensing region; and
determining, that the touch event is a false touch if a proportion of the number of the effective touch points in the first region to a number of total pixel points in the first region is less than a first threshold value or greater than a second threshold value, wherein the second threshold value is greater than the first threshold value.

13. The method according to claim 12, wherein the reference data comprises a reference numerical value of each of a plurality of pixel points in the first region, and the touch data comprises a touch numerical value of each of the plurality of the pixel points in the first region; and
the determining, by the coprocessor, the number of the effective touch points in the first region according to the touch data and the reference data comprises:
determining, by the coprocessor, an effective touch threshold value for the first region according to the touch numerical value of each of the plurality of the pixel points and the reference numerical value of each pixel point; and
determining, by the coprocessor, that a first pixel point is an effective touch point if an absolute value of a difference between a touch numerical value of the first pixel point in the first region and a reference numerical value of the first pixel point is greater than the effective touch threshold value for the first region.

14. The method according to claim 13, wherein determining, by the coprocessor, the effective touch threshold value for the first region according to the touch numerical value of each pixel point in the first region and the reference numerical value of each pixel point in the first region comprises:
determining, by the coprocessor, a parameter BR1 according to the following equation:

$$BR1 = \frac{\sum_{x,y} \text{abs}(B(x, y) - R(x, y))}{L}$$

wherein B(x, y) is a reference numerical value of a pixel point (x, y) in the first region, R(x, y) is a touch numerical value of the pixel point (x, y), abs( ) denotes calculating an absolute value, $\Sigma_{x, y}$ denotes calculating a sum for the plurality of the pixel points in the first region, and L is a number of the plurality of the pixel points; and
determining, by the coprocessor, the effective touch threshold value for the first region according to the parameter BR1.

15. The method according to claim 12, wherein the fingerprint sensing region further comprises a second region; the method further comprises:
determining, by the coprocessor, a number of effective touch points in the second region according to the touch data and the reference data; and
the determining, that the touch event is the false touch if the proportion of the number of the effective touch points in the first region to the number of the total pixel points in the first region is less than the first threshold value or greater than the second threshold value comprises:
determining, by the coprocessor, that the touch event is a false touch if a ratio of the number of the effective touch points in the second region to a number of total pixel points in the second region is less than the first threshold value or greater than the second threshold value, and the proportion of the number of the effective touch points in the first region to the number of the total pixel points in the first region is less than the first threshold value or greater than the second threshold value.

16. The method according to claim 11, wherein before acquiring, by the coprocessor, the touch data corresponding to the touch event that is collected on the fingerprint sensing region of the touch panel by the fingerprint module, the method further comprises:
acquiring, by the coprocessor, the reference data of the fingerprint sensing region through the fingerprint module; and
storing, by the coprocessor, the acquired reference data in a memory; and
the acquiring, by the coprocessor, the reference data of the fingerprint sensing region comprises:
acquiring, by the coprocessor, the reference data of the fingerprint sensing region that is stored in the memory.

17. The method according to claim 10, wherein before acquiring, by the coprocessor, the touch data corresponding to the touch event that is collected on the fingerprint sensing region of the touch panel by the fingerprint module, the method further comprises:
determining, by the coprocessor, whether a touch position corresponding to the touch event is located in the fingerprint sensing region; and
instructing, by the coprocessor, the fingerprint module to collect the touch data of the fingerprint sensing region if it is determined that the touch position corresponding to the touch event is located in the fingerprint sensing region.

* * * * *